TRANSMISSION SYSTEM

Filed Oct. 24, 1955 2 Sheets-Sheet 1

INVENTORS
FRANK DE JAGER
JOHANNES WILHELMUS KLUTE
BY Fred M. Vogel
AGENT

Oct. 3, 1961 F. DE JAGER ET AL 3,003,037

TRANSMISSION SYSTEM

Filed Oct. 24, 1955 2 Sheets-Sheet 2

INVENTOR
FRANK DE JAGER
JOHANNES WILHELMUS KLUTE
BY Fred M. Vogel
AGENT

United States Patent Office 3,003,037

Patented Oct. 3, 1961

3,003,037

TRANSMISSION SYSTEM

Frank de Jager and Johannes Wilhelmus Klute, Eindhoven, Netherlands, assignors, by mesne assignments, to North American Philips Company, Inc., New York, N.Y., a corporation of Delaware Filed Oct. 24, 1955, Ser. No. 542,375
Claims priority, application Netherlands Oct. 25, 1954
12 Claims. (Cl. 179—15.55)

The invention relates to a transmission system comprising a transmitter and a receiver for the transmission of speech signals in which the transmitter and the receiver comprise a band compression device and a band expansion device respectively. Such systems, may, for example, be used advantageously in carrier wave telephone systems, inter alia to increase the communication capacity.

The invention has for its object to provide a transmission system of the aforesaid kind, which achieves on the one hand an appreciable economy of the band width and on the other hand a substantially faithful reproduction of the speech.

In accordance with the invention the transmitter comprises a plurality (at least two) of parallel-connected channels, fed by signals representing different formant ranges, one of these channels transmitting faithfully one of the lower formant ranges, the other channels comprising each a band compressor, whereas the receiver comprises a corresponding number of parallel-connected channels which are fed via selective filters by signals representing the different formant ranges, the receiving channel (first receiving channel) corresponding to the first transmitter channel passing the incoming signals faithfully, the other channels being provided each with a band expandor.

The invention and its advantages will now be described more fully with reference to the figures.

Figure 1:
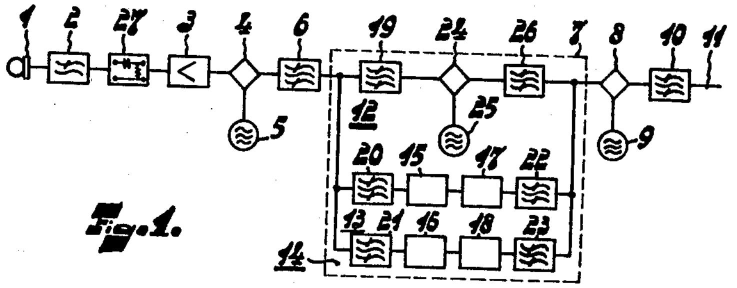
Figure 2:
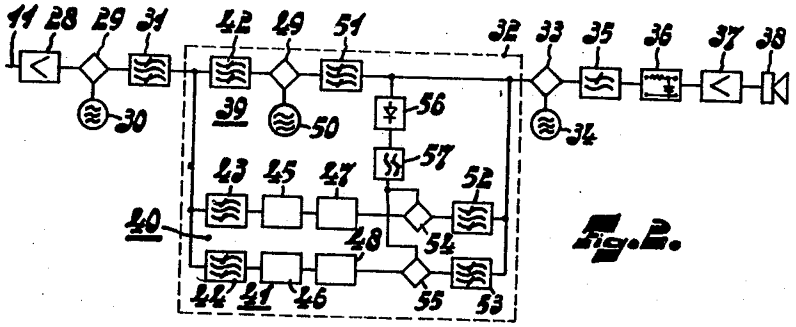
Figure 3:
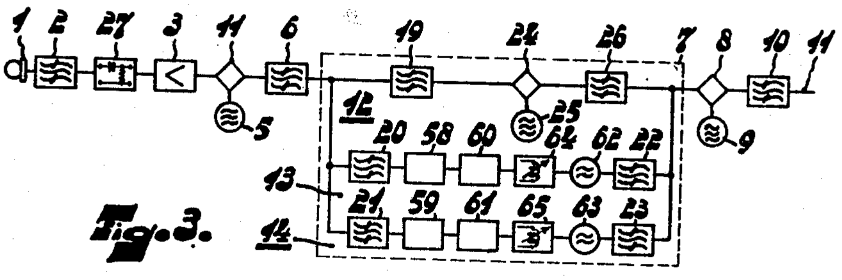
Figure 4:
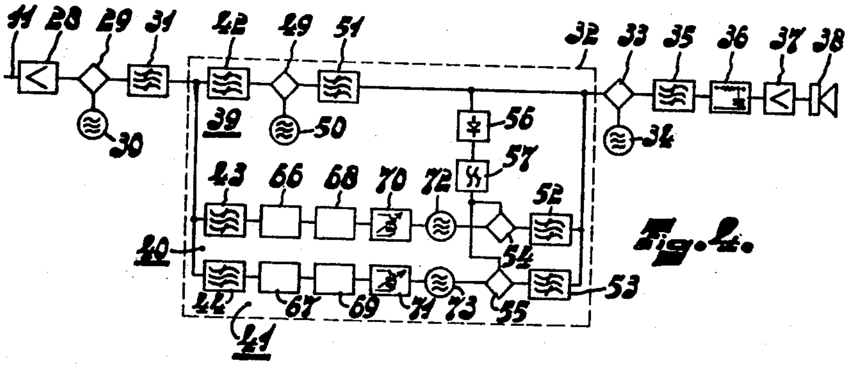
Figure 5:
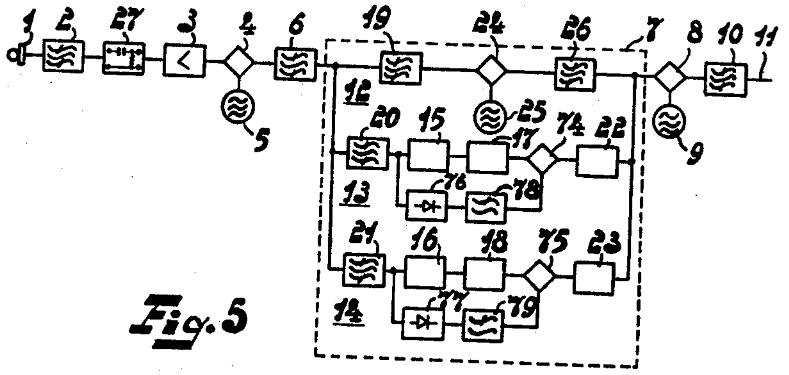
Figure 6:
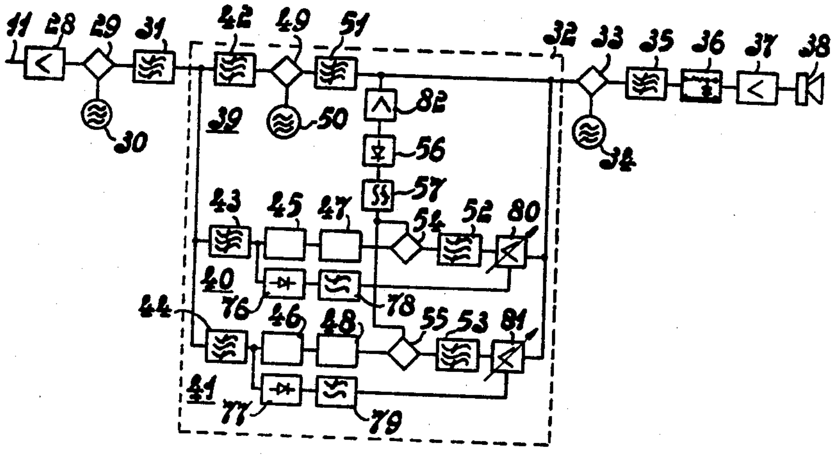

FIGS. 1 and 2 show one embodiment of a transmitter and a receiver respectively for a transmission system according to the invention;

FIGS. 3 and 4 show a variant of the transmitter and receiver shown in FIGS. 1 and 2 and the system shown in FIGS. 5 and 6 represents an improvement in the transmission system shown in FIGS. 3 and 4.

The transmitter and the receiver shown in FIGS. 1 and 2 form part of a carrier-wave telephone system, which is intended for the transmission of speech signals by means of single-sideband modulation.

In the transmitter shown in FIG. 1 the signals obtained from a microphone 1 are supplied via a filter 2, passing the speech signals from 300 to 3200 c./s., subsequent to amplification in an amplifier 3, to a single-sideband modulator 4 with an oscillator 5 connected thereto and producing, for example 60 kc./s. and with a single-sideband filter 6, which passes, for example the upper sideband (60.3 to 63.2 kc./s.).

The single-sideband signal thus obtained is supplied to a band compression device 7, which is connected via a group modulator 8 with an oscillator 9 and an output filter 10 to a transmission cable 11.

In accordance with the invention the band compression device comprises a plurality of parallel-connected channels, which are fed by single-sideband signals representing different formant ranges one of these channels 12 passing one of the lower formant ranges in a faithful manner, each of the other channels 13 and 14 being provided with a band compressor 17 and 18 respectively.

It has been found to be advantageous in practice to provide a limiter 15 and 16 before the band compressor 17 and 18 respectively.

In order to feed the parallel-connected channels by means of the single-sideband signals representing the different formant ranges, each channel comprises an input filter 19, 20, 21 which passes the single-sideband signals of those applied thereto lying between 60.3 and 63.2 kc./s. which lie in the frequency ranges from 60.3 to 60.8 kc./s., 60.8 to 62 kc./s. and 62 to 63.2 kc./s. respectively; the single-sideband signal of the frequency band from 60.3 to 60.8 kc./s. is transmitted faithfully via the channel 12, whilst the single-sideband signals of the frequency bands from 60.8 to 62 kc./s. and from 62 to 63.2 kc./s. are supplied via the limiters 15 and 16 to the band compressors 17 and 18 respectively, which, in the arrangement shown, are constituted by frequency division circuits shaped in the form of counting circuits, comprising a counting tube and an output filter to suppress unwanted distortion products. If the division factor is, for example, 10, in the frequency division circuits 17, 18, respectively, single-sideband signals are obtained in the frequency band from 6.08 to 6.2 kc./s. and 6.2 to 6.32 kc./s. from the single-sideband signals from 60.8 to 62 kc./s. and 62 to 63.2 kc./s. respectively, these signals being applied to the output filters 22 and 23 respectively.

In order to transmit the single-sideband signals in the channels 12, 13 and 14 in adjacent frequency ranges, the channel 12 comprises a frequency transforming stage 24, to which is connected an oscillator 25, producing a frequency of 54.72 kc./s. and an output filter 26, which transfers the single-sideband signal from 60.3 to 60.8 kc./s. to the frequency range of 5.58 to 6.08 kc./s. The output signal of the band compression device 7 lies in the frequency range from 5.58 to 6.32 kc./s., so that the bandwidth is 0.74 kc./s.

Compared with the bandwidth of the initial single-sideband signal (2.9 kc./s.) a material economy in bandwidth is thus obtained, whilst moreover, the speech signal thus transmitted by band compression may be reproduced at the receiver and with a particularly good quality.

In order to improve the transmission quality in view of the property of the limiters 15 and 16 in the band compression channels 13 and 14 to pass the speech components of the single-sideband signals supplied thereto having a larger amplitude in a more satisfactory manner than the others, it has been found to be advantageous to supply the speech signals from the microphone 1 via a pre-emphasis network 27 to the single-sideband modulator 4. The pre-emphasis network provides an amplitude equalization of the signals to be transmitted, so that in the limited single-sideband signals, which represent the speech signals of the formant ranges from 300 to 2000 c./s. and from 2000 to 3200 c./s. also the higher speech components of these formant ranges are represented fairly well.

Instead of using the frequency division circuits shown in the embodiment use may be made of other frequency division circuits. Use may, for example, be made of a counting circuit comprising a plurality of pulse generators exciting one another successively each of these pulse generators producing a division by a factor 2 (so-called binary counting circuit). For the frequency division use may furthermore be made with advantage of an oscillator tuned approximately to the desired subharmonic of the carrier-frequency of the single-sideband signal and synchronized by the limited single-sideband signal (cf. Proceedings of the I.R.E. of December 1944, pages 730 to 737).

FIG. 2 shows the receiver co-operating with a transmitter shown in FIG. 1.

The incoming signals from the transmission cable 11 are supplied, subsequent to high-frequency amplification in the amplifier 28, via a group demodulator 29 with an oscillator 30, connected thereto, and with an output filter 31, to a band expansion device 32 which is connected to a single-sideband demodulator 33, comprising a local oscillator 34 and a filter 35, passing only the speech-frequency band from 0.3 to 3.2 kc./s. The low-frequency signals obtained are supplied via a de-emphasis network 36 and a low-frequency amplifier 37 to a reproducing device 38.

The band expansion device 32 comprises three channels 39, 40, 41 each having an input filter 42, 43, 44 which divides the single-sideband signal obtained from the group demodulator 29 lying for example in the frequency band from 5.58 to 6.32 kc./s. into the single-sideband signals representing the three formant ranges from 5.58 to 6.08 kc./s., 6.08 to 6.2. kc./s. and 6.2 to 6.32 kc./s.; the single-sideband signal from 5.58 to 6.08 kc./s. is passed through the channel 39 in a faithful manner whilst the single-sideband signals from 6.08 to 6.2 kc./s. and 6.2 to 6.32 kc./s. in the channels 40 and 41 are supplied via limiters 45 and 46 to frequency multipliers 47 and 48, which supply, by frequency multiplication by a factor 10, the single-sideband signals lying in the initial formant ranges from 60.8 to 62 kc./s. and 62 to 63.2 kc./s. The frequency multipliers are provided with a suitable output filter in order to suppress distortion products.

In order to cause the single-sideband signal of 5.58 to 6.08 kc./s. to occupy the correct frequency position with respect to the single-sideband signals from 60.8 to 62 kc./s. and from 62 to 63.2 kc./s., the channel 39 comprises a frequency transposition stage 49 comprising a local oscillator 50, producing a frequency of 54.72 kc./s. and an output filter 51. The output signal of the frequency transposition stage 49, 50, 51 lying in the frequency band from 60.3 to 60.8 kc./s. is supplied, together with the single-sideband signals from 60.8 to 62 kc./s. and from 62 to 63.2 kc./s. obtained via the output filters 52 and 53 from the channels 40 and 41, to the single-sideband demodulator 33, at the input of which is thus produced a single-sideband signal lying in the initial frequency band from 60.3 to 63.2 kc./s., of which the single-sideband signal from 60.3 to 60.8 kc./s. representing the lowest formant range is faithfully transmitted.

In the system described above it may be advantageous to include a threshold device in the channels for the higher formant ranges, in order to suppress interference signals during the speech intervals.

The intelligibility of the transmitted speech is found to be excellent in this case, whilst the indentification of the voices may be considered to be satisfactory.

By using the system described above, the transmitted speech is determined with great accuracy, i.e. a faithful reproduction of speech can be attained to a great approximation.

The frequency multiplying circuits may be constituted advantageously by those used with frequency-modulation transmission (cf. for example French patent specification No. 972,594).

The dynamic power of the speech components in the formant ranges from 800 to 2000 c./s. and from 2000 to 3000 c./s., transmitted with constant amplitude, may be introduced at the receiver end in a simple manner by providing an amplitude modulator 54 and 55 in each of the channels 40 and 41 between the frequency multiplier 47 and 48 and the output filter 52 and 53 respectively, this modulator being controlled by the output voltage of an envelope detector connected to the channel 39 and comprising an amplitude detector 56 and a subsequent low-pass filter 57, having a cut-off frequency of 300 c.s. It is found that the dynamic power of the speech components in the formant ranges from 800 to 2000 c./s. and from 2000 to 3200 c./s. follows that of the lowest formant range.

It has been found that in the system described above only two parts of the frequency bands need be transmitted, since the frequency band from 300 to 800 c./s. may be transmitted faithfully and the frequency band from 800 to 3200 c./s. may be transmitted with the band compression. It even sufficies to transmit only the formant range from 800 to 2000 c./s. with band compression in addition to the frequency band from 300 to 800 c./s.

Instead of transmitting faithfully the speech components in the formant range from 300 to 800 c./s., the speech components in the formant range from 800 to 2000 c./s. may, as an alternative be transmitted faithfully. However, the band width of this formant range is larger.

It is not absolutely necessary to transmit the speech frequency band from 300 to 800 c./s. by means of single-sideband modulation, but to this purpose use may be made of frequency modulation in a narrow band (module for Example 1) or the low-frequency signal itself may be transmitted.

A variant of the system described above is shown in FIGS. 3 and 4 of which FIG. 3 shows the transmitter and FIG. 4 the receiver. Corresponding elements are designated by the same reference numerals.

The transmitter shown in FIG. 3 differs from the transmitter shown in FIG. 1 in the construction of the band compression circuits in the channels 13 and 14. In these channels the single-sideband signals obtained from the input filters 20 and 21 are supplied via a limiter 58 and 59 to a frequency discriminator 60 and 61, which is coupled with a frequency modulator 64 and 65, connected to an oscillator 62 and 63 respectively, for example a reactance tube. The band compressor 60, 64, 62 and 61, 65, 63 respectively, is constructed in a manner such that a frequency variation of the limited single-sideband signal produces a proportionally smaller frequency variation in the oscillator frequency via the frequency discriminator 60, 61 and the frequency modulator 64, 65; for example a frequency variation of the limited single-sideband signal may, be reduced to a tenfold smaller variation of the oscillator frequency, i.e. the band compression factor is 10.

FIG. 4 shows the corresponding single-sideband receiver, in which the single-sideband signal obtained from the input filters of the channels are supplied via a limiter 66 and 67 to a band expander, comprising the frequency discriminator 68 and 69 with a subsequent frequency modulator 70 and 71, which is coupled with a local oscillator 62 and 63 respectively the construction of this band expander thus cooperating to the band compressor used in the transmitter. However, this band expander is proportioned to be such that a frequency variation of the limited single-sideband signal produces a corresponding larger variation of the oscillator frequency; in the embodiment shown, in order to re-obtain the initial single-sideband signal, the band expansion factor is chosen to be 10.

In the system shown small differences between the band compression and the band expansion factors appear to be permissible which is of particular importance for a simple construction of the band compression and the band expansion devices.

If the band compression and the band expansion devices are constructed in a suitable manner, the frequency transformation stages, 24, 25, 26 and 49, 50, 51 may be dispensed with.

A further improvement in the transmission quality may be realized by using the system shown in FIGS. 5 and 6; this improvement resides in that the speech components of the various formant ranges are joined in the correct intensity ratio.

In the transmitter shown in FIG. 5 the single-side band signals from the band compressors 17 and 18 are, to this end, supplied to an amplitude modulator 74 and 75, which is controlled by the output voltage of an envelope detector, connected to the output circuit of the single-sideband filter and comprising an amplitude detector 76 and 77 and a low-pass filter 78, and 79 respectively, having a cut-off frequency of for example 40 c./s. Then the level of the output signals of the channels 13 and 14 is determined by the speech components applied to these channels.

In order to reproduce the speech components in the various formant ranges in the correct intensity ratio at the receiver end (cf. FIG. 6), an envelope detector, constituted by an amplitude detector 76 and 77 and a low-pass filter 78 and 79 with a cut-off frequency of for example 40 c./s. is connected to each of the filters 43 and 44 of the channels 40 and 41 respectively, the output voltage of this detector controlling a control-tube 80 and 81, connected after the amplitude modulator 54 and 55 respectively, in order to control the level. In order to prevent the signals from the channel 39 from affecting the signal levels of the channels 40 and 41, the signals from the channel 39 are supplied to the envelope detector via an A.V.C. amplifier 82, the A.V.C.-voltage being obtained by rectification on the signals supplied to the channel 39.

For the level control the control-tube 80 and 81 may, as an alternative, be connected between the envelope detector 56 and 57 and the amplitude modulator 54 and 55 respectively. The dynamic power-control and the level control do substantially not affect one another, since they are operative in different frequency ranges.

When using this single-sideband system a substantially faithful speech reproduction was obtained.

In order to further improve the economy in bandwidth, the band compression factor of the single-sideband system described above may be increased; band compression factors of 40 to 50 may be applied.

What is claimed is:

1. A single-sideband transmission system comprising a transmitter having a source of single-sideband modulated signals, a plurality of parallel-connected signal channels, means for splitting said signals into a plurality of different formant frequency ranges corresponding to said plurality of signal channels, means for feeding said formant frequency ranges respectively through said signal channels whereby the signal in each channel retains its single side-band modulation characteristic, at least some but not all of said channels including compressor means for compressing the frequency range of the single-sideband modulated signals passed therethrough, and means for simultaneously transmitting the output signals of said signal channels, and a receiver having a plurality of signal channels corresponding to said transmitter signal channels, means for feeding the received signals of the formant frequency ranges respectively through said receiver channels, at least some but not all of said receiver channels including expander means for expanding the frequency range of the single-sideband modulated signals passed therethrough in a manner corresponding inversely to the said frequency compression of the signals in the respective formant ranges, and means for combining the output signals of said receiver signal channels.

2. A system as claimed in claim 1, in which each of said receiver channels which includes expander means also includes a limiter connected at a position preceding the expander means.

3. A system as claimed in claim 1, in which said compressor means have the property of shifting the frequency of the respective compressed formant ranges, and in which at least one of said transmitter channels which does not include a compressor means includes a frequency shifting means for shifting the frequency of the respective non-compressed formant range.

4. A system as claimed in claim 1, in which said expander means have the property of shifting the frequency of the respective expanded formant ranges, and in which at least one of said receiver channels which does not include an expander means includes a frequency shifting means for shifting the frequency of the respective non-expanded formant range.

5. A system as claimed in claim 1, in which said compressor means comprises a frequency division circuit.

6. A single-sideband transmission system comprising a transmitter having a source of single-sideband modulated signals, a plurality of parallel-connected signal channels, means for splitting said signals into a plurality of different formant frequency ranges corresponding to said plurality of signal channels, means for feeding said formant frequency ranges respectively through said signal channels whereby the signal in each channel retains its single-sideband modulation characteristic, at least some but not all of said channels including compressor means for compressing the frequency range of the single-sideband modulated signals passed therethrough, and means for simultaneously transmitting the output signals of said signal channels, and a receiver having a plurality of signal channels corresponding to said transmitter signal channels, means for feeding the received signals of the formant frequency ranges respectively through said receiver channels, at least some but not all of said receiver channels including expander means for expanding the frequency range of the single-sideband modulated signals passed therethrough in a manner corresponding inversely to the said frequency compression of the signals in the respective formant ranges, means for combining the output signals of said receiver signal channels, said compressor means comprising an oscillator tuned substantially to a subharmonic of the respective signal, and means for synchronizing said oscillator with said respective signal.

7. A system as claimed in claim 1, in which said compressor means comprises a local oscillator, a frequency modulator connected to control said local oscillator, and a frequency discriminator connected to control said frequency modulator in accordance with the signal fed to the respective transmitter channel.

8. A system as claimed in claim 1, in which said expander means comprises a frequency multiplier circuit.

9. A system as claimed in claim 1, in which said expander means comprises a local oscillator, a frequency modulator connected to control said local oscillator, and a frequency discriminator connected to control said frequency modulator in accordance with the signal fed to the respective receiver channel.

10. A single-sideband transmission system comprising a transmitter having a source of single-sideband modulated signals, a plurality of parallel-connected signal channels, means for splitting said signals into a plurality of different formant frequency ranges corresponding to said plurality of signal channels, means for feeding said formant frequency ranges respectively through said signal channels whereby the signal in each channel retains its single-sideband modulation characteristic, at least some but not all of said channels including compressor means for compressing the frequency range of the single-sideband modulated signals passed therethrough, and means for simultaneously transmitting the output signals of said signal channels, and a receiver having a plurality of signal channels corresponding to said transmitter signal channels, means for feeding the received signals of the formant frequency ranges respectively through said receiver channels, at least some but not all of said receiver channels including expander means for expanding the frequency range of the single-sideband modulated signals passed therethrough in a manner corresponding inversely to the said frequency compression of the signals in the respective formant ranges, dynamic power restoring means comprising an envelope detector connected to detect the signal in the receiver channel which is not provided with an expander means, and means connected in at least one of the receiver channels having an expander means for modulating the expanded signal with the output signal of said envelope detector.

11. A system as claimed in claim 10, in which said dynamic power restoring means includes an automatic gain-controlled amplifier connected to control the amplitude of said signal which is detected by the envelope detector.

12. A system as claimed in claim 1, in which each of said transmitter channels having compressor means includes an amplitude modulator connected to the output of the respective compressor means and an amplitude detector connected between the input of the respective compressor means and an input of the associated said amplitude modulator, and in which each of said receiver channels having expander means includes an amplitude level control circuit connected to receive the respective expanded signal, and an amplitude detector connected to the input of the respective expander means and adapted to apply the detected signal to the level control circuit as a control voltage therefor.

References Cited in the file of this patent

UNITED STATES PATENTS

| | | |
|---|---|---|
| 1,812,405 | Ives | June 20, 1931 |
| 2,176,526 | Friend | Oct. 17, 1939 |
| 2,269,295 | Vadersen | Jan. 6, 1942 |
| 2,653,221 | Carnahan | Sept. 22, 1953 |
| 2,817,711 | Feldman | Dec. 24, 1957 |